United States Patent
Manchi et al.

(10) Patent No.: US 12,056,561 B1
(45) Date of Patent: Aug. 6, 2024

(54) COMPUTER VISION AND RFID OBJECT DETECTION

(71) Applicant: Amazon Technologies, Inc., Seattle, WA (US)

(72) Inventors: Vamsi Manchi, Bangalore (IN); Yeswanth Kumar, Bangalore (IN); Biju K Varughese, Gurugram (IN); Nitesh Garg, Bangalore (IN); Pragati Changappa, Bangalore (IN); Paromita Lahiri, Bengaluru (IN)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 17/709,912

(22) Filed: Mar. 31, 2022

(51) Int. Cl.
*G06K 7/10* (2006.01)

(52) U.S. Cl.
CPC .............................. *G06K 7/10336* (2013.01)

(58) Field of Classification Search
None
See application file for complete search history.

(56) References Cited

U.S. PATENT DOCUMENTS

| | | | | |
|---|---|---|---|---|
| 10,600,138 | B2* | 3/2020 | Stortstrom | G06V 20/653 |
| 2014/0307076 | A1* | 10/2014 | Deutsch | G06V 10/56 |
| | | | | 348/77 |
| 2017/0255820 | A1* | 9/2017 | Liu | H04Q 5/22 |
| 2022/0215706 | A1* | 7/2022 | Wakako | G08B 13/19645 |

\* cited by examiner

*Primary Examiner* — Thien M Le
*Assistant Examiner* — April A Taylor
(74) *Attorney, Agent, or Firm* — Kilpatrick Townsend & Stockton LLP

(57) ABSTRACT

Techniques for an objection detection feature are described herein. Images of an object captured by a camera may be received along with information that includes a first timestamp. A presence of the object and a type of the object may be determined based on a computer vision model that uses the images. First RFID data may be received from an RFID sensor from an RFID tag associated with the object. The first RFID data may include a second timestamp and an identifier for the RFID tag. A determination that the object has entered the area may be determined based on the presence of the object within the images, the first RFID data, the first timestamp, and the second timestamp. A threshold for the object may be determined based on the first timestamp, the second timestamp, and one or more policies for the area.

20 Claims, 8 Drawing Sheets

COMPUTER VISION AND RFID OBJECT DETECTION

BACKGROUND

Conventionally, systems may utilize RFID tags and sensors to detect a presence of certain equipment or to detect objects entering an area. However, false positive detection may occur when RFID tags merely pass the sensors without entering the area. Further, changes to infrastructure or movement of objects in a facility may cause obstructions to weaken or block the signal from RFID tags and sensors placed in the facility. Conventional systems also fail to properly capture and analyze when multiple RFD tags attempt to enter an area. Lag time between sensor activation and analyzing by conventional computer systems may also lead to problems in equipment or object detection. As a result, conventional methods fail to properly capture events such as detection of equipment or object detection for entering an area, are prone to false positives, and lack the real time response required for some facilities.

BRIEF DESCRIPTION OF THE DRAWINGS

Various embodiments in accordance with the present disclosure will be described with reference to the drawings, in which.

DETAILED DESCRIPTION

Figure 1:
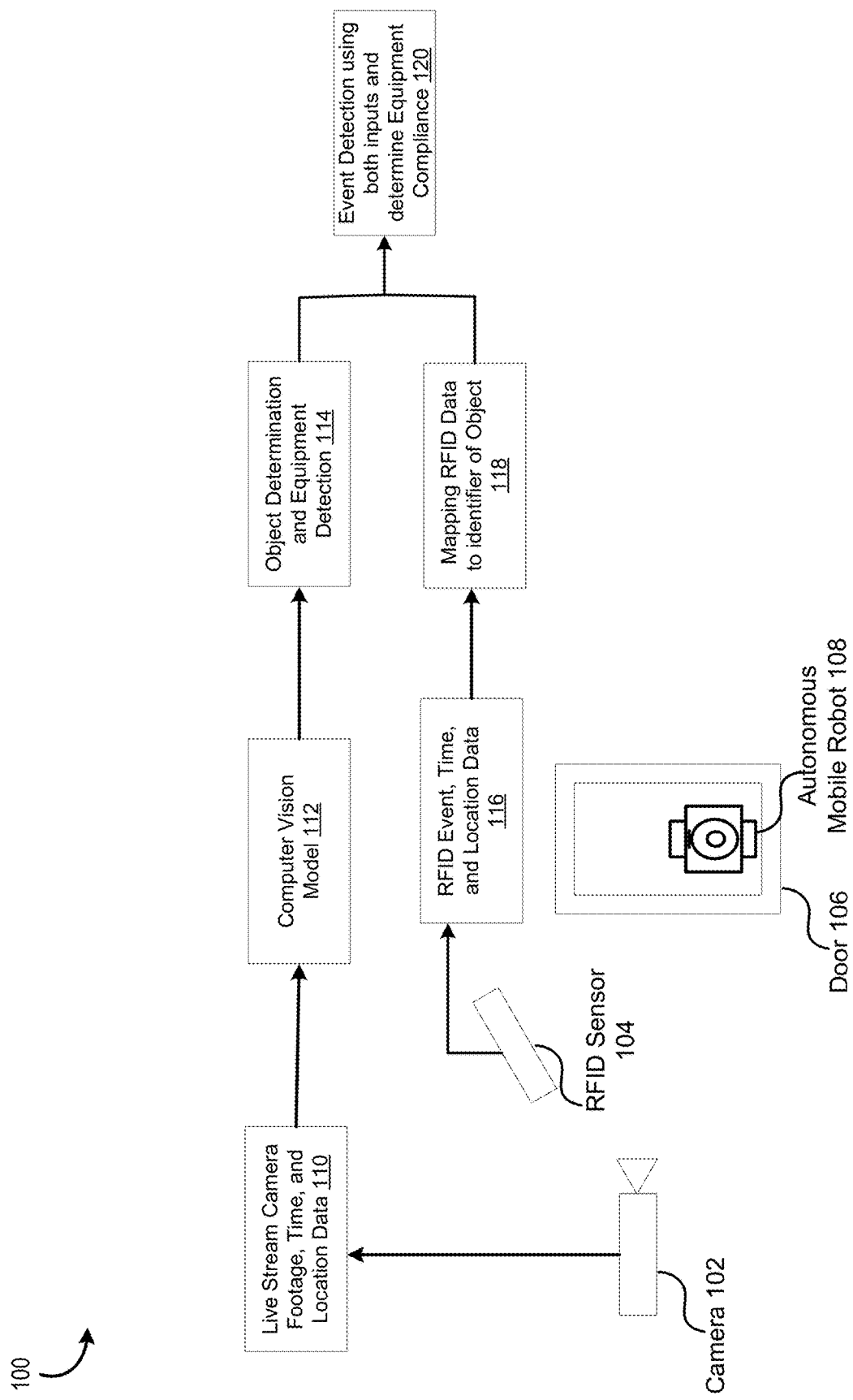
FIG. 1 illustrates a workflow of an object detection feature including a camera and an RFID sensor, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for implementing an object detection feature for detecting a presence and type of an object entering or exiting an area using multiple data inputs. Specifically, service provider computers implementing the object detection feature can correlate radio frequency identification (RFID) data received from an RFID tag associated with the object and read by an RFID sensor with images (video, live stream footage, etc.) obtained by a camera to detect the presence of the object entering (entry event) or exiting (exit event) an area. In embodiments, the object detection feature implemented by the service provider computers includes using one or more trained computer vision models to detect the presence of an object in images or video captured by a camera as well as determine a type of the object. For example, one computer vision model may be trained to detect the presence of a human in images captured by a camera as opposed to an inventory holder. Another example computer vision model may be trained to detect the presence of an automated mobile robot in images captured by a camera as opposed to a human. In accordance with at least one embodiment, each object may be associated with an RFID tag associated with RFID data. The RFID data may include a unique identifier associated with the tag. For example, a human which may include an associate, a user, or an entity, may wear a lanyard which includes an RFID tag with a unique identifier. In the case of inanimate objects, such as carts, inventory holders, etc., the RFID tag may be attached to the object or otherwise incorporated into the object.

The object detection feature described herein utilizes a certain configuration of a camera and RFID sensor (reader or sensor) located around or within a certain volume space of an entryway or door to an area. The area may correspond to a high traffic area, a special type of area (e.g., freezer or loading dock) or construction area. The area or areas may be within a facility, warehouse, or other such structure but need not be. The service provider computers implementing the object detection feature may maintain one or more policies for each area which identify a length of time (time threshold) that an object should be present in each area before needing to exit the area. For example, in the case of a freezer area which maintains a cold temperature, a policy may indicate that a person should not remain in the freezer area for more than 30 minutes before exiting the area. The policy may further indicate that the same person should not enter back into the freezer area until a warm up period has expired (e.g., 15 minutes). In some examples, the policy may indicate that only one of a type of equipment should be present in an area. In such cases, if an RFID tag associated with the same type of equipment is detected by the cameras and/or RFID sensors, the service provider computers may generate and transmit a notification identifying the violation and requiring enforcement of the policy. The data obtained by the camera (images or video) as well as the RFID sensor (RFID data from RFID tag(s)) can be analyzed by the service provider computer implementing the object detection feature to determine that an object has entered an area and generate a time threshold for each object according to the time that the object entered the area as well the policies maintained for the area. To continue the example above, in the case of a person entering a freezer area and the service provider computers determining that the person has entered the area, the service provider computers may generate a time threshold of 30 minutes and associate the time threshold with the identifier of the RFID tag associated with the person. The service provider computers can maintain and track the time threshold and upon expiration of the time threshold, and no exit event by the person detected, generate and transmit a notification to a user device associated with the person. The notification may include information such as the time threshold, the current amount of time the person has been in the area, as well as instructions to guide the person out of the area. In accordance with at least one embodiment, the service provider computers may maintain one or more thresholds associated with policies for an area. For example, a threshold and policy combination may identify a certain type of object only be present in an area (such as autonomous mobile robots for a loading dock), a certain number of a type of object in an area, or a certain combination of number and type of object that should be present in an area at any given time.

In accordance with at least one embodiment, the same configuration of camera and RFID sensor at the entryway or door of the area may be used to detect the presence of an object, the type of the object, and that the object is exiting the area (exit event). For example, the service provider computers may receive images from the camera to determine, using the implemented computer vision models, that a person is exiting the area as well as RFID data from the sensor read by an RFID tag associated with the person to determine that the person is exiting the area. Additionally, the identifier included in the RFID data may be mapped to the identifier and time threshold association to determine that the person did not violate the policies for the area and to disassociate the relationship between the identifier and the time threshold. By disassociating the time threshold and the identifier for the RFID tag the service provider computers identify that the object, such as a person, is no longer in the area and therefore no longer needs to have a time threshold maintained for the object in the area. In embodiments, the camera or cameras situated within the volume of space of an entryway, exit, or door to an area may be associated with or otherwise incorporate motion detection sensors. The images or video captured by the camera or cameras may only be captured upon the motion detection sensors detecting movement or motion of an object within its detection range. Upon detecting movement or motion by the motion detection sensors the camera may be activated to capture the images or video within the lens space of the camera for the entryway, exit, or door of the area.

In accordance with at least one embodiment, the camera may be configured to transmit, via one or more available networks, the images or video captured by the camera along with information about the images or video. The information may include a timestamp (first timestamp) which identifies the time (a time period in seconds, minutes, hours, or corresponding to a local time standard) that the camera captured the images or video as well as location information for the camera that captured the images or video. The location information may correspond to coordinates such as global positioning system (GPS) data or coordinates, or coordinates which are particular to a facility or area (particular specified coordinate system for each facility or area). The location information may also include an identifier for the camera which may be mapped, by the service provider computers, to a location of the camera within a facility or area according to maintained records or data. In embodiments, the RFID sensor capturing RFID data from RFID tags may provide the RFID data to the service provider computers via one or more available networks. In embodiments, an RFID sensor may include an RFID reader, antenna, hardware, or modules capable of interacting (reading) with RFID tags, filtering noise or false reads, as well as communicating with other components such as a computer system (service provider computers) via an associated network such as a wireless network.

The RFID data may include the identifier for the RFID tag, as well as the time (second timestamp) which identifies the time that the RFID sensor captured the RFID data from the RFID tag. The RFID data may also include location information for the RFID sensor similar to the location information for the camera (e.g., coordinates, local coordinates, GPS coordinates, etc.). In accordance with at least one embodiment, the service provider computers may correlate or utilize the time information and/or location information from the camera(s) and RFID sensor(s) to determine that an object has entered an area and to associate the data point events together. For example, if two data point events, one from a camera and one from an RFID sensor, include the same or similar time information (e.g., both data point events were captured by the respective devices at the same or similar time) than the events can be associated with each other and used to determine whether an object has entered an area. If, however, only one data point event is received, such as only RFID data from an RFID sensor, without corresponding camera footage captured by a camera located in the same area, then the computer system may determine that the object did not enter the area. By using both data points the service provider computer can rule out false reads such as situations where an object has passed by the entryway, thereby activating the RFID sensor, but has not actually entered the area via an associated door, and thus not activating the motion sensing camera. In such cases the time threshold and identifier for the object would not be generated and associated with each other so as to avoid keeping track of false events. In some events, one set of data input, such as the images or video captured by the camera may be used as a ground truth as to the determination of a presence and type of object as well as the determination that the object has entered the area. Thus, the service provider computers may determine that an object has entered an area absent corresponding RFID data from an RFID sensor.

In accordance with at least one embodiment, the service provider computers may train and implement one or more computer vision models that are trained to detect the presence or absence of certain equipment or objects in images or video captured by the motion sensing camera. For example, one computer vision model may be trained to detect the presence or absence of certain personal protective equipment such as protective vests, hard hats, gloves, etc. Each piece of personal protective equipment may be associated with an RFID tag for providing RFID data to the service provide computers via associated RFID sensors. The service provider computers may maintain one or more policies for each area or facility which indicate the number and type of equipment required by objects to enter and remain in an area. In embodiments, the object detection feature includes using the images or video captured by a camera as well as RFID data from RFID tags obtained by RFID sensors to determine a presence and type of equipment entering or exiting an area. Each RFID tag associated with each piece of equipment may be correlated to the analyzed images obtained by the camera to determine the presence and type of equipment entering or exiting an area. For example, for a freezer area of a facility, a policy may indicate that a protective cold temperate vest must be work by persons entering the freezer area. The protective cold temperate vest may be associated with an RFID tag. If the person is wearing their vest as they enter the area, the service provider computers will receive the video footage and RFID data obtained by the camera and RFID sensor of the area, and determine using the video footage and RFID data that the person is wearing their vest and therefore not violating the policy for the area. However, should the person enter the freezer area without their vest, the service provider computers may determine, using the video footage obtained by the camera, that the person is not wearing their vest. The service provider computers may verify this determination by not receiving a corresponding RFID data from an RFID tag associated with the vest from the RFID sensor. In response, the service provider computers may generate and transmit a notification to a user device of the person identifying the missing protective vest with instructions to exit the area and obtain the protective vest.

FIG. 1 illustrates a workflow of an object detection feature including a camera and an RFID sensor, in accordance with at least one embodiment. FIG. 1 depicts workflow 100 for an object detection feature as described herein. Workflow 100 includes camera 102, RFID sensor 104, door 106, and autonomous mobile robot 108. As described herein, camera 102 may be associated with a motion detection sensor such that footage (video or images) may only be captured by camera 102 in response to the motion detection sensor detecting motion of an object. The workflow 100 depicts camera 102 and RFID sensor 104 being situated or located near or within a volume of space around the door 106 for capturing data of objects entering or exiting door 106 (such as autonomous mobile robot 108). The camera 102 may capture live stream camera footage and obtain a timestamp (time) for when the camera 102 captured the camera footage, as well as location data identifying a location of the camera 102 capturing the footage at 110. In embodiments, the camera 102 may be configured to transmit the camera footage, time, and location data to service provider computers which implement and train a computer vision model 112.

In embodiments, the computer vision model 112 may be configured to determine a presence and type of an object in frames of video or images captured by camera 102 as well as the presence and type of equipment such as personal protective equipment (PPE) included in the frames of video or images captured by camera 102 at 114. Workflow 100 also depicts simultaneously, or at substantially the same time period, the RFID sensor 104 capturing an RFID event at 116. An RFID event may correspond to the RFID sensor 104 obtaining a read or capturing data from an RFID tag associated with an object. For example, the autonomous mobile robot 108 may be associated with an RFID tag that has a unique identifier. The RFID event 116 may include a timestamp and location data that identifies when the RFID sensor 104 obtained the RFID data from an RFID tag and the location of the RFID sensor 104 when obtaining the RFID data from the RFID tag. The RFID event 116 and the data for the event (identifier, time, and location information) may be transmitted to the service provider computers implementing the object detection feature. Workflow 100 depicts the service provider computers mapping the RFID data to an identifier of an object at 118.

For example, the RFID data may include an identifier of the object (autonomous mobile robot 108) which is then mapped together such that the service provider computers map the RFID event 116 to the object (autonomous mobile robot 108). The workflow 100 includes the service provider computers determining an entry event (event detection 120) using both the live stream camera footage 110, the output from the computer vision model 112 (object determination and equipment detection 114) as well as the RFID event 116 to determine a presence and type of an object entering or exiting door 106. For example, the service provider computers may determine, using the computer vision model 112, that the camera footage 110 indicates the presence of autonomous mobile robot 108 in the camera footage 110. The presence of the object (108) may be verified using the RFID event data 116 such as by verifying that both data events occurred at the same or substantially the same time period such as by comparing time stamps for both events.

Similarly, the service provider computers may determine a presence or absence of equipment (120), including the type of equipment, using the live camera footage 110 and RFID event data 116. As described herein, the service provider computers may generate and maintain a time threshold to associate with an object (108) which can be tracked until expiration of the time threshold. If an exit event (another event detection at door 106) is not received for the same object (108) prior to the expiration of the time threshold, the service provider computers may generate and transmit a notification which identifies the object and the expiration of the time threshold. The notification may include instructions for exiting an area such as by passing through door 106 to trigger the exit event detection. Other notifications may be generated based on determining the absence of equipment. For example, upon determining that a certain piece of equipment is missing or absent in the camera footage 110 and no corresponding RFID data event 116 is provided for the required equipment for an area, a notification may be generated. The notification may identify the missing piece of equipment and provide instructions to obtain the equipment and then return to the area via door 106.

Figure 2:
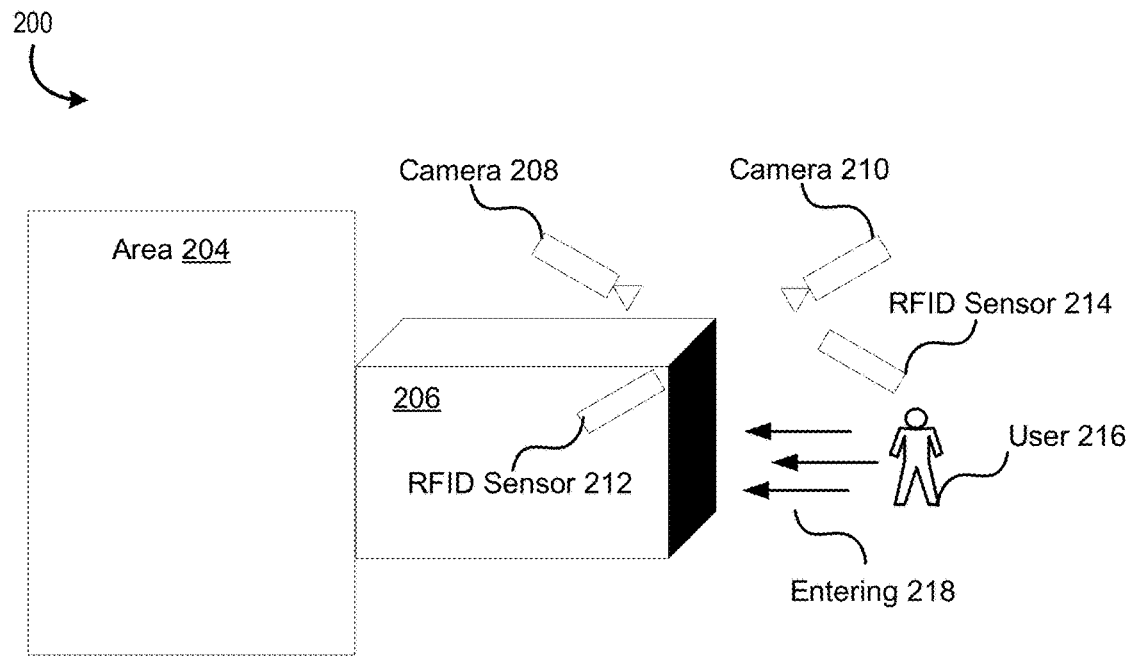
FIG. 2 illustrates example configurations of camera(s) and RFID sensor(s) for implementing an object detection feature, in accordance with at least one embodiment.
Figure 2:
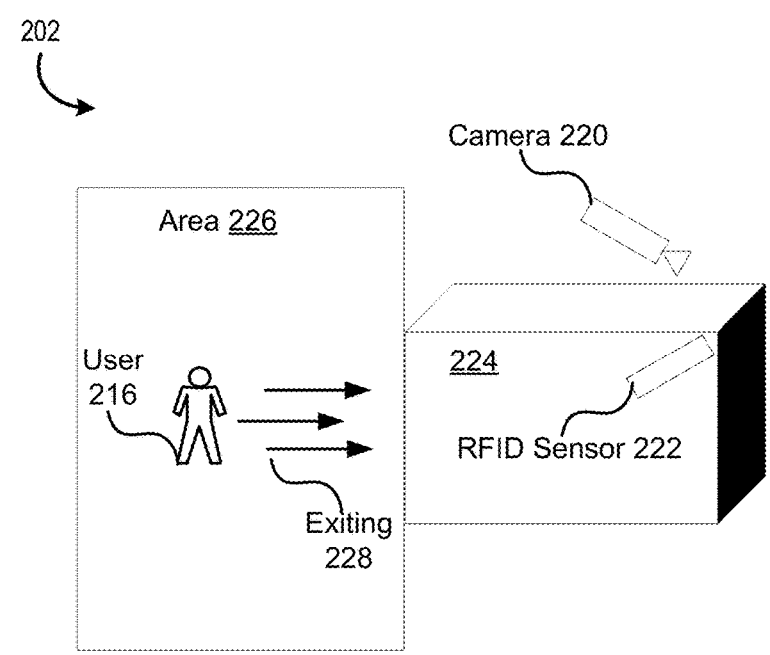

FIG. 2 illustrates example configurations of camera(s) and RFID sensor(s) for implementing an object detection feature, in accordance with at least one embodiment. FIG. 2 depicts example configurations 200 and 202. Although FIG. 2 depicts a certain number of components such as camera(s) and RFID sensor(s) embodiments described herein are not limited to such numbers. The amount and type of cameras and RFID sensors are not limited to those illustrated in FIG. 2. Example configuration 200 includes a representation of an area 204 with entryway 206, cameras 208 and 210, and RFID sensors 212 and 214. FIG. 2 for configuration 200 also depicts a user 216 entering 218 the entryway 206 to access area 204. In embodiments, the cameras 208 and 210 may be motion activated cameras or be associated with motion detection sensors (not pictured) such that they only capture video or images in response to detecting motion by the motion detection sensors. The motion detection sensors and cameras 208 and 210 may be in communication through hardwire means, landlines, or via remote network capabilities such as Bluetooth or wireless networks. In embodiments, the cameras 208 and 210 as well as RFID sensors 212 and 214 may provide data or information (images or video captured by cameras 208 and 210 and RFID data captured from RFID tags by RFID sensors 212 and 214) to the service provider computers via available networks (not pictured).

As depicted in FIG. 2, the configuration 200 includes camera 208 situated in such a location so as to face one direction of the entryway 206 and camera 210 situated in a different location so as to face another direction of the entryway 206. In embodiments, one or more cameras, such as cameras 208 and 210, may be situated around the entryway 206, the area 204, in a number of different locations and configurations so as to cover a different areas by the sensing capabilities (lens capability) of each camera and associated motion detection sensor. Configuration 200 also depicts RFID sensor 212 and RFID sensor 214 placed in different locations or configurations around entryway 206 to obtain RFID data from RFID tags that come within reading or data transmittal range of RFID sensors 212 and 214. Although configuration 200 includes a certain configuration such that some components (camera 208 and RFID sensor 212) are within an entryway 206 to area 204 and other components (camera 210 and RFID sensor 214) are located outside of the entryway 206 to area 204, the embodiments disclosed herein are not limited to such configurations. Moreover, although FIG. 2 depicts the cameras 208 and 210 and RFID sensors 212 and 214 as facing a certain direction relative to the entryway 206 and/or area 204, the embodiments disclosed herein are not limited to such configurations. The placement and facing of components 208, 210, 212, and 214 need not be stationary and may be placed and/or faced in a variety of suitable facings or placements as required. As described herein, the service provider computers may utilize the data captured by cameras 208 and 210 as well as RFID sensors 212 and 214 to determine that an object is entering the area 204 (such as user 216) as well as the type of object entering the area 204 (a person as opposed to an inventory holder moving under its own propulsion mechanisms).

The cameras 208 and 210 may be configured to provide video or images of the user 216 entering 218 the entryway 206 and/or the area 204 as well as information about the video or images. The information about the video or images captured by cameras 208 and 210 may include a timestamp for when the footage was captured by cameras 208 and/or 210 as well as location information for the cameras 208 and 210 which captured the footage. The RFID sensors 212 and 214 may also provide RFID data from an RFID tag associated with user 216 as they enter 218 the entryway 206 and/or area 204. The RFID data may include an identifier associated with the RFID tag that is unique, a timestamp which identifies when the RFID sensors 212 and 214 obtained the RFID data from the RFID tag associated with user 216, and location information which identifies the location of RFID sensors 212 and 214. As described herein, the location information may include coordinates with respect to the entryway 206 and/or area 204, coordinates within a facility, or GPS coordinates.

The location information provided by the cameras 208 and 210 as well as RFID sensors 212 and 214 may include an identifier such as a hardware identifier that is associated with each component (208-214). In embodiments, the data obtained by components 208-214 may be analyzed to determine not only the presence of an object but the type of object and whether that object is entering or exiting the entryway 206 and/or area 204. For example, the computer vision models implemented by the service provider computers may be trained to determine the motion and direction of an object by analyzing the video or images captured by cameras 208 and 210. Frame by frame analysis using the computer vison models may identify the direction and motion of an object which can be used along with location information of an entryway, such as 206, and area 204, to determine that an object such as user 216 is entering 218 the entryway 206 and/or area 204, or leaving the entryway 206 and/or area 204. The computer vision models may also analyze the time information associated with footage captured by cameras 208 and 210 as well as the presence of the same object in the footage to determine motion of the object as well as direction or facing of the object. As described herein, the service provider computers may generate time thresholds, associate an identifier of an RFID tag associated with user 216 with the time threshold upon determining an entry event, as well as disassociate the identifier from the time threshold upon determining an exit event for the user 216. In embodiments, the particular components that are activated and provide data to the service provider computers may be utilized to determine an entry or exit event. For example, if only camera 210 and RFID sensor 214 provide data to the service provider computers, this may be an indication that user 216 is only walking by the entryway 206 and not entering the entryway 206 and area 204. However, if cameras 210 and 208, as well as RFID sensors 212 and 214 provide data to the service provider computers (e.g., video or images as well as RFID data), the service provider computers may determine that the user 216 is entering 218 the entryway 206 and area 204 and not merely walking by the entryway 206.

Example configuration 202 illustrated in FIG. 2 depicts another configuration of components such as camera 220 and RFID sensor 222 placed within entryway 224 for area 226. Configuration 202 places components 220 and 22 inside entryway 224 or within a certain location such that they face a certain direction or able to capture a certain portion of data associated with entryway 224. As depicted in FIG. 2, although configuration 202 utilizes less components than configuration 200, the same object detection features may be achieved. By placing components 220 and 222 inside entryway 224 or facing a certain direction with respect to entryway 224 and area 226 false positives may be avoided. For example, a user walking by entryway 224 may be out of range of cameras 220 and RFID sensor 222 such that no event will be detected or determined. However, should user 216 who is exiting 228 area 226 walk past entryway 224, camera 220, and RFID sensor 222, the service provider computers may determine that an exit event has occurred. The same situation can apply for an entry event if an object were to enter entryway 224 and be captured by camera 220 and have RFID data read by RFID sensor 222.

Figure 3:
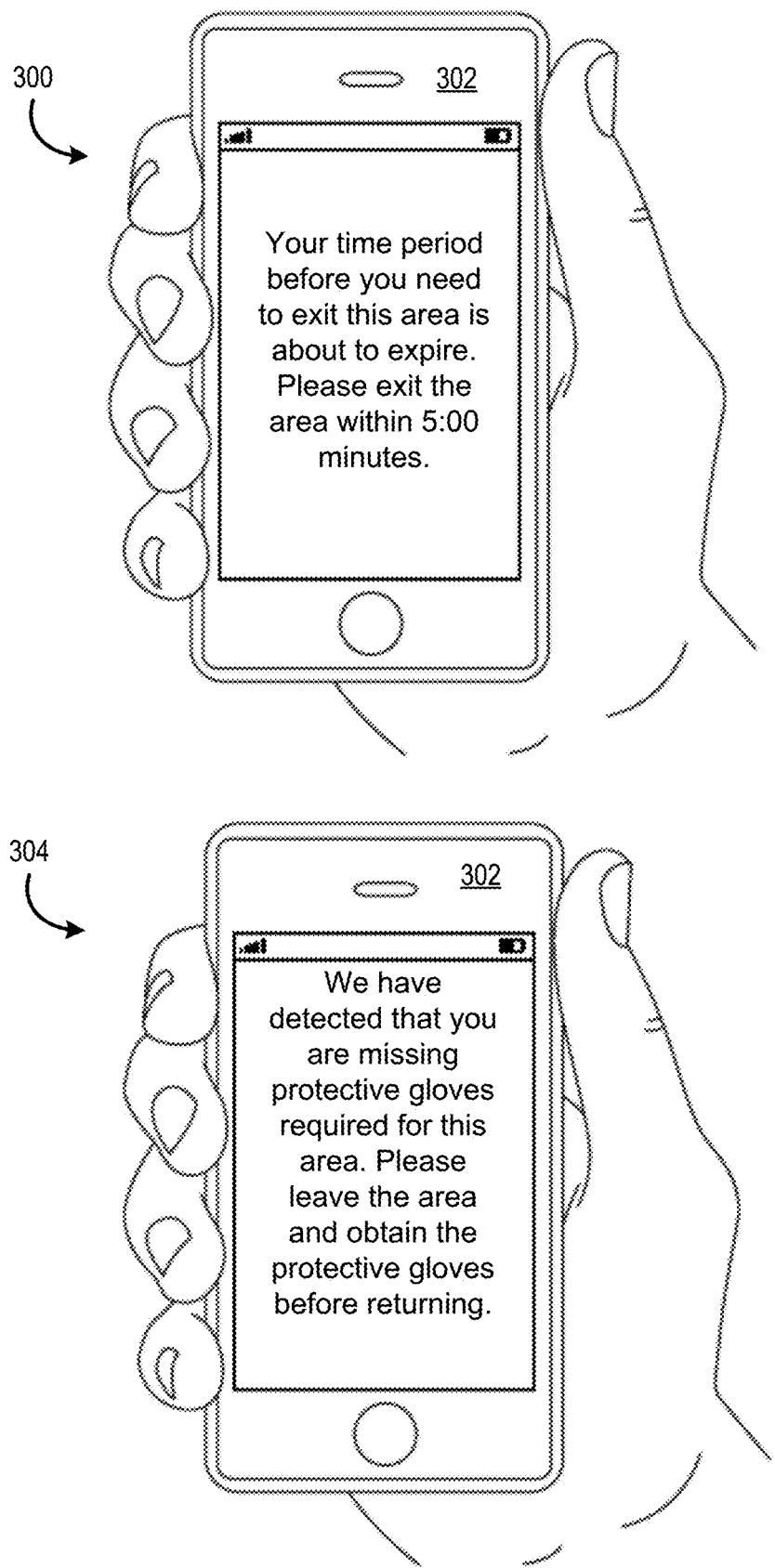
FIG. 3 illustrates example user interfaces of a user device presenting example notifications generated by an object detection feature, in accordance with at least one embodiment.

FIG. 3 illustrates example user interfaces of a user device presenting example notifications generated by an object detection feature, in accordance with at least one embodiment. FIG. 3 depicts notification 300 presented via user device 302. As described herein, upon the expiration of a time threshold and no exit event detected (e.g., the same identifier that was previously determined to enter an area is determined to have left the area before the expiration of the time threshold), the service provider computers may generate and transmit a notification to a user device associated with the identifier. In embodiments, the service provider computers may maintain a mapping of identifiers to user devices (user device identifiers) for determining which user device to transmit the generated notification 300. As illustrated in FIG. 3, notification 300 may indicate that a person has not been detected as leaving an area and is close to the time threshold for themselves and the area.

In some examples, the notification may indicate that the user has remained in the area past the time threshold and needs to leave the area. Although FIG. 3 depicts a handheld user device, such as a mobile phone or tablet device, embodiments described herein are not as limited. In some embodiments, the notifications generated by the service provider computers may be provided to other user devices of other entities, such as an administrator or supervisor associated with an area. The notification may identify the identifier of the person or object that needs to exit the area as well as include instructions for locating the person or object in the area. In some examples, where the object is an inanimate object such as an autonomous mobile robot moving inventory within an area, the object may not exit the area by the required time threshold because of an equipment malfunction or other equipment error. In such cases, instructions may be provided to the administrator or supervisor for the area to locate and remove the object from the area so as to maintain safety protocols for the area.

FIG. 3 also depicts notification 304 being presented by user device 302. Notification 304 may be generated and transmitted to user device 302 by the service provider computers in response to a detection that certain equipment or objects for an area are absent. For example, some areas may be associated with policies which require gloves to be worn by persons when entering and working in an area. In embodiments, the service provider computers may generate notification 304 which identifies the missing equipment along with instructions to exit the area and obtain the equipment before returning. In some embodiments, the service provider computers may generate a time threshold for the identifier of the RFID tag for the equipment and resend the notification upon expiration of the time threshold in situations where an exit event has not been detected for the identifier. In some cases, the service provider computers may also generate and transmit a notification to an administrator or supervisor of an area to locate a person that is missing the equipment to aid them in leaving the area or obtaining the missing piece of equipment.

Figure 4:
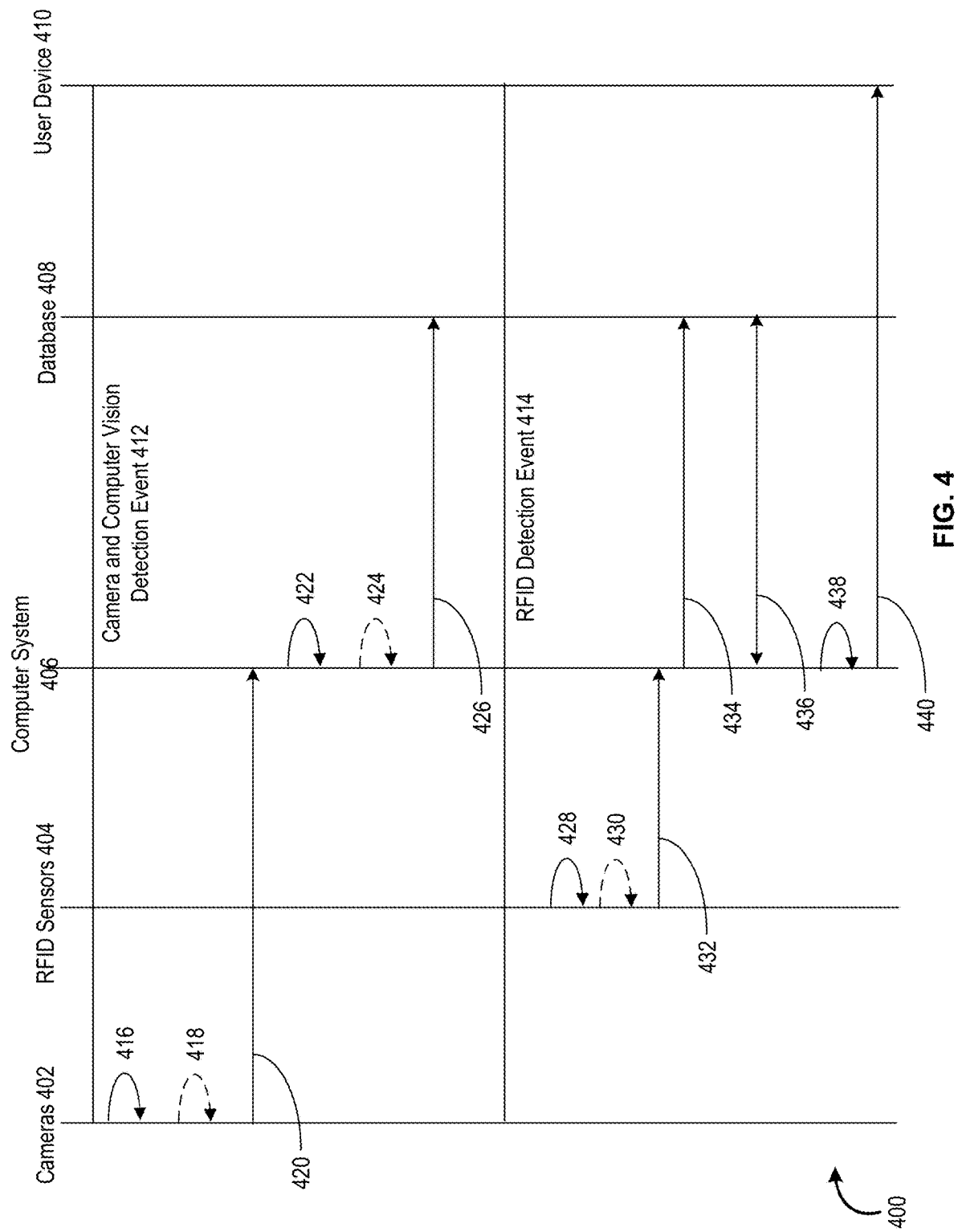
FIG. 4 illustrates a swim lane diagram including cameras, RFID sensors, a computer system, a database, and a user device for an object detection feature, in accordance with at least one embodiment.

FIG. 4 illustrates a swim lane diagram including cameras, RFID sensors, a computer system, a database, and a user device for an object detection feature, in accordance with at least one embodiment. FIG. 4 depicts swim lane diagram 400 which includes cameras 402, RFID sensors 404, a computer system 406, a database 408, and user device 410. The components 402-410 may be in communication via one or more available networks such as a wireless network or wireless internet connection. The swim lane diagram 400 depicts events and communications between the components 402-410 for the object detection features described herein. Events include camera and computer vision detection event 412 and RFID detection event 414. As described herein, both events 412 and 414 may be used by the service provider computers (computer system) to determine a presence of an object, determine the type of object, and determine whether the object is entering or exiting an area. In embodiments, the camera component 402 may be associated with or otherwise incorporate a motion detection sensor. For the camera and computer vision detection event 412, cameras 402 may detect motion of an object and capture images and video of the object at 416. In embodiments, the cameras 402 may optionally be configured to implement and invoke the computer vision models for determining a presence of an object as well as the type of the object at 418 (represented as a dashed line). At 420, the cameras 402 may transmit the recorded footage to the computer system 406. In scenarios where the cameras 402 implement the computer vision models, the cameras 402 would provide the determined object detection to computer system 406 at 420. In embodiments, the cameras 402 also provide information about the recorded footage at 420 to the computer system 406 such as a timestamp and location information for the cameras 402.

The computer system at 422 may utilize the one or more computer vision models to analyze the received footage at 420 to determine the presence of an object as well as the type of object. The computer system at 424 may filter out or remove invalid detections based on previously provided instructions. For example, some areas may only be monitored to determine the presence of a person entering the area and if the computer vision models do not detect the presence of a person, the event may end here and no further action is taken. However, some areas may include policies which may be triggered by any object or person entering the area such that no event is filtered out or removed at 424. At 426 the computer system may store the details of the camera and computer vision detection event 412 in database 408. The details of the event 412 which are stored in database 408 may include the timestamp, location information, the output or determination made by the computer vision models, or other data.

The RFID detection event 414 may include RFID sensors 404 capturing RFID data from RFID tags of objects or equipment within detection range of the RFID sensors 404 at 428. The RFID sensors 404 may be configured to filter out certain RFID data or reads provided by RFID tags according to associated calibration data at 430. The calibration data may identify certain RFID tag reads by the RFID sensors 404 for filtering out and further reporting based on the strength of the read of a given RFID tag or other metrics. In some embodiments, the RFID sensors 404 do not filter out any RFID tag reads or RFID data obtained from RFID tags and report all events to the computer system 406. At 432, the RFID sensors 404 may transmit the RFID data read by RFID sensors 404 to computer system 406. In embodiments, the RFID data may include an identifier for the RFID tag which was read or sensed by the RFID sensors 404, a timestamp for when the RFID tag was read or sensed, and location information which identifies a location of the RFID sensors 404 that interacted with the RFID tags for the event 414. At 434, the computer system 406 may store the RFID detection event 414 in database 408 which includes the RFID data provided by the at 432 by the RFID sensors 404.

The computer system 406 may query the database 408 at 436 for camera and computer vision detection events 412 (such as 426) using the timestamp and location information provided to the computer system 406 at 420 and 432 to associate together (correlate the camera and computer vision detection event 412 with the RFID detection event 414). For example, the computer system 406 may query the database 408 for events that occurred at the same time period (same timestamp) or substantially the same time (timestamps within a certain time period of each other (events 412 and 414)). The computer system 406 may determine that an entry or exit event has occurred at 438 using the results of the query from database 408. The computer system 406 may generate a time threshold for the event, associate the identifier of the RFID tag associated with the event 414, and track the time threshold until an exit event occurs with the same identifier for the RFID tag. If an exit event occurs the computer system may disassociate the time threshold from the identifier. In embodiments, the association and disassociation of identifiers to time thresholds may be maintained in database 408 (not pictured). The computer system 406 may generate and transmit a notification to user device 410 in response to the expiration of a time threshold for an identifier that is maintained by the computer system 406 at 440. As described herein, the notification may be generated as a result of a violation of a policy tied to the area and used when generating the time threshold, such as a time period that a person should continue to be in a freezer area before being required to exit the freezer area. It should be understood that although FIG. 4 and the description included herein describes an event of an object entering or exiting an area, the association and disassociation of time thresholds for an identifier of an RFID associated with the object, the embodiments disclosed herein are not limited to such descriptions. For example, the swim lane diagram 400 of FIG. 4 can also be utilized to describe scenarios for determining equipment compliance where pieces of equipment are associated with their RFID tags and the computer vision models are trained and implemented to determine a presence and type of equipment. Notifications can be generated which identify missing pieces of equipment determined by the computer system 406 in response to the data captured by the cameras 402 and RFID sensors 404.

Figure 5:
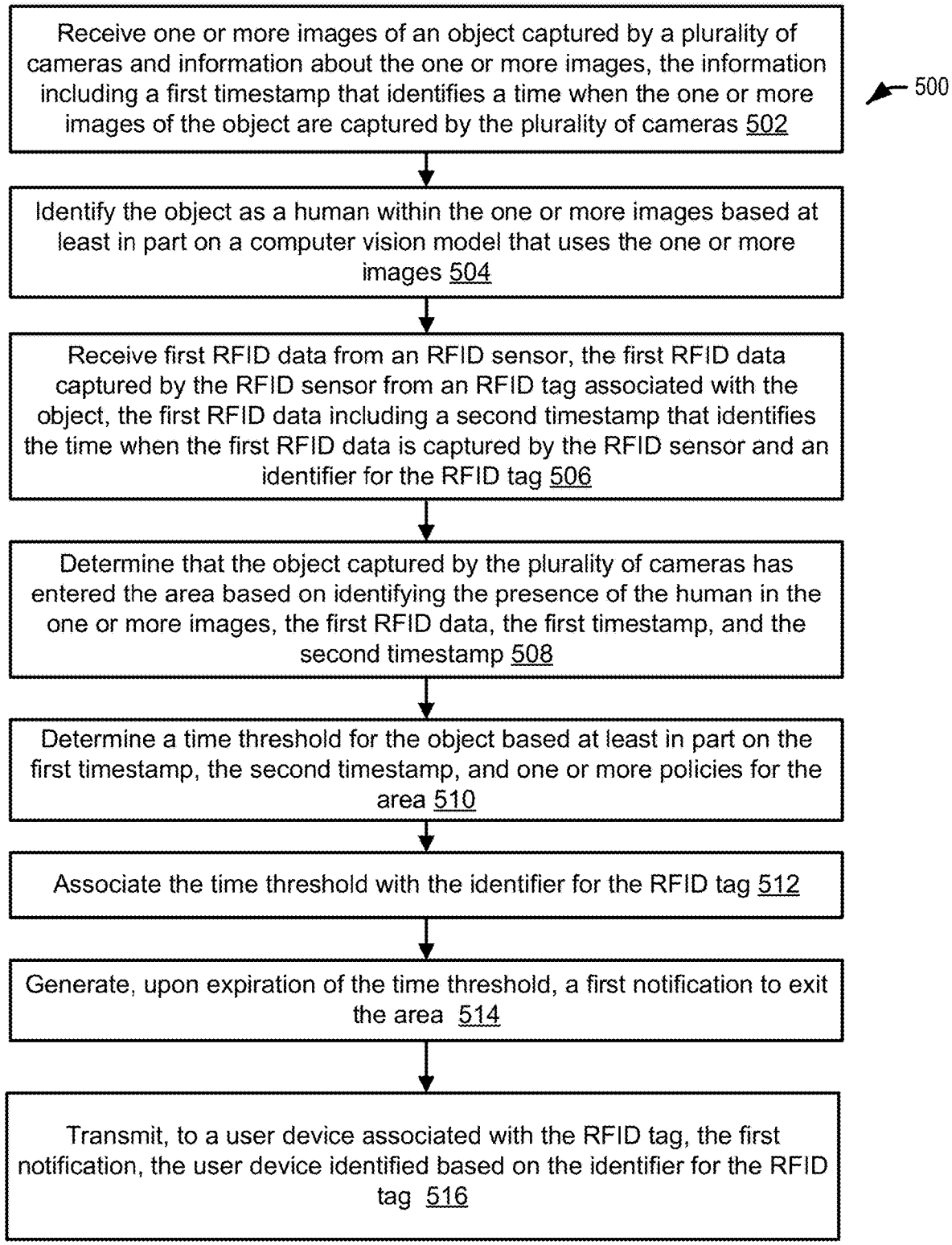
FIG. 5 illustrates an example flow chart for an object detection feature, in accordance with at least one embodiment.
Figure 6:
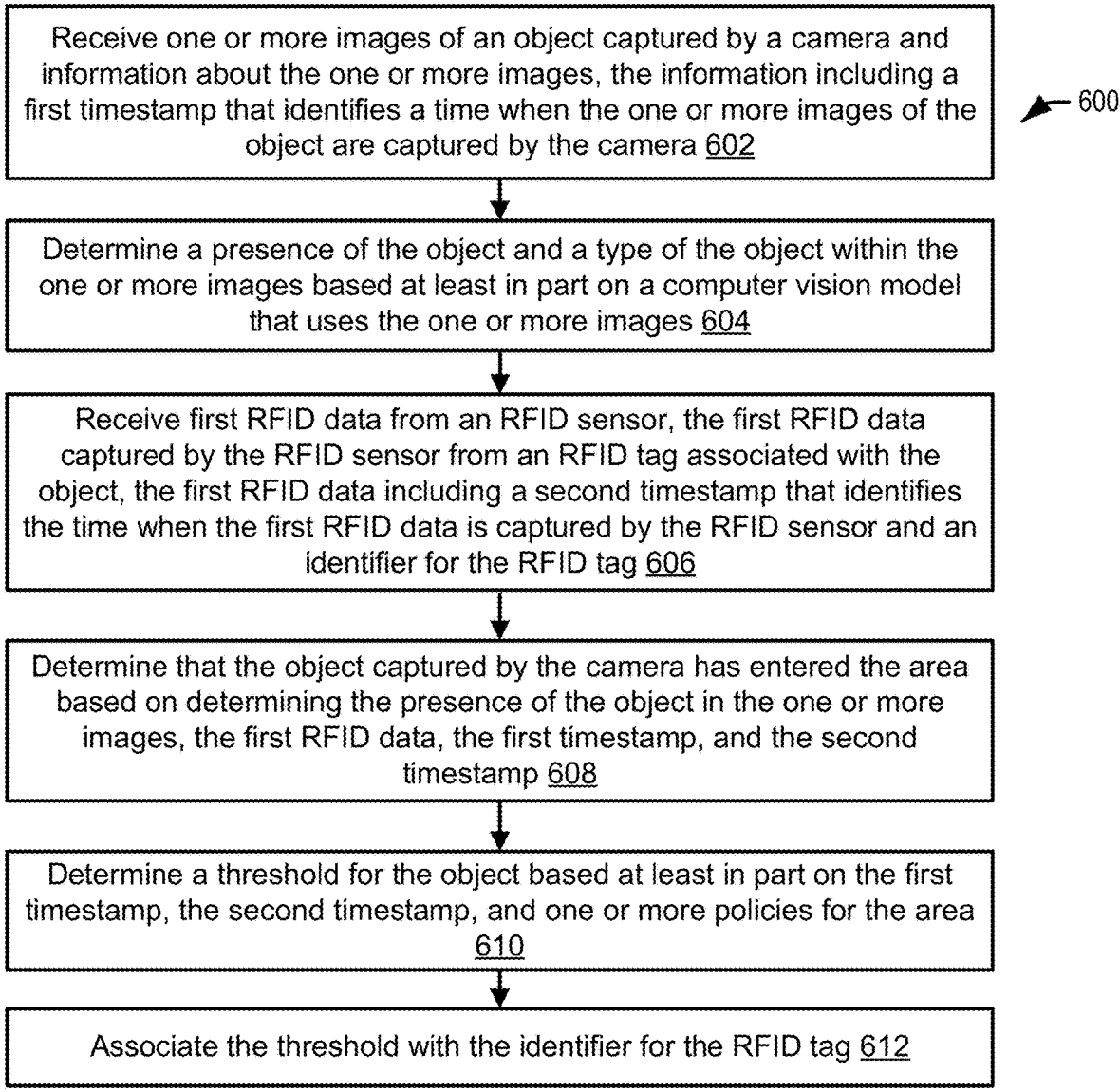
FIG. 6 illustrates an example flow chart for an object detection feature, in accordance with at least one embodiment.

FIGS. 5 and 6 illustrate example flow charts for object detection features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
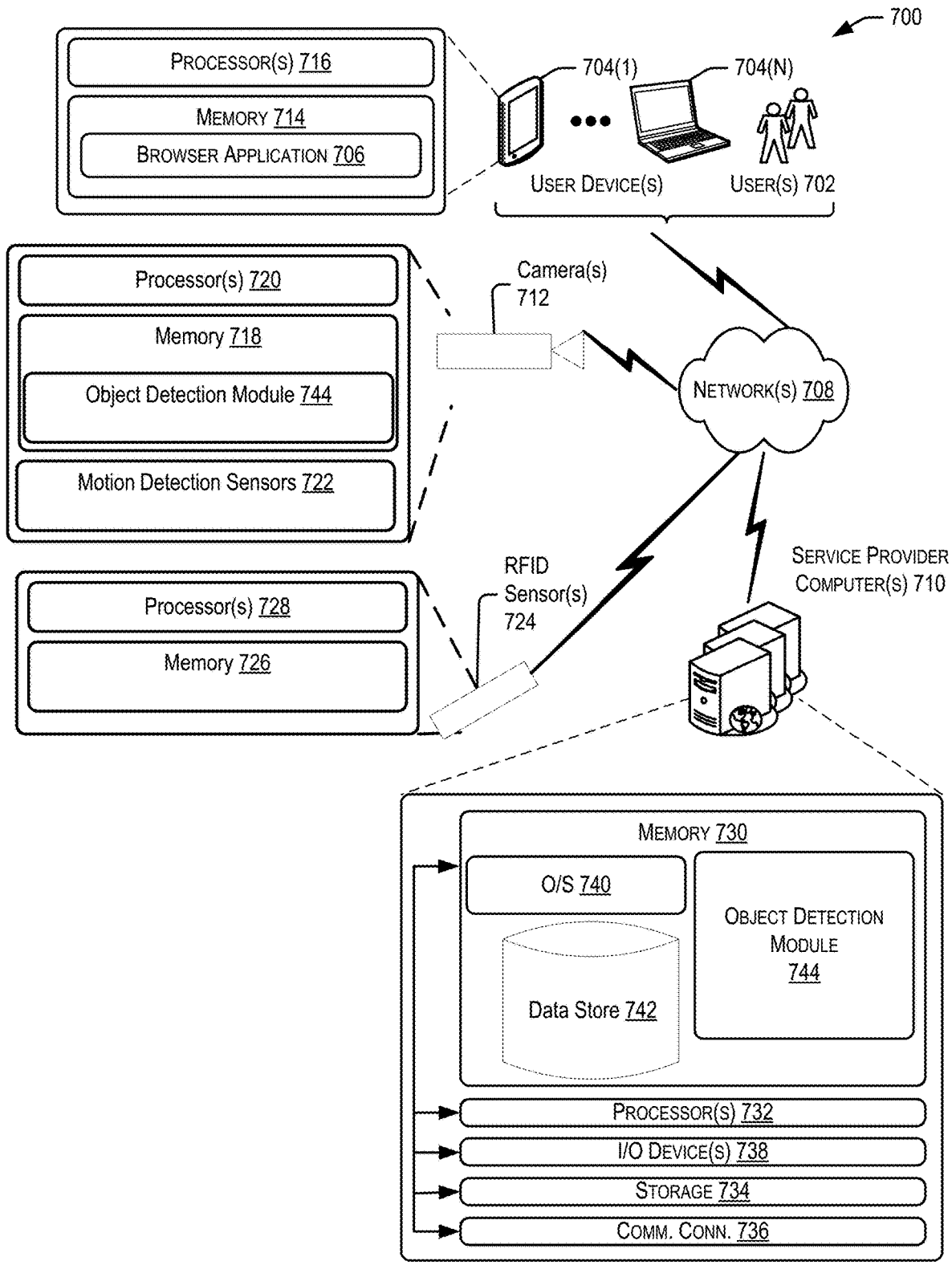
FIG. 7 illustrates an example architecture for an object detection feature that includes one or more service provider computers, a user device, camera(s), and RFID sensor(s), in accordance with at least one embodiment.

In some examples, service provider computers (service provider computers 710) utilizing at least the object detection module 744 depicted in FIG. 7 may perform the processes 500 and 600 of FIGS. 5 and 6. In FIG. 5, the process 500 may include receiving one or more images of an object captured by a plurality of cameras and information about the one or more images at 502. The information may include a first timestamp that identifies a time when the one or more images of the object are captured by the plurality of cameras. The information may further include a location of a camera, a portion of cameras, or the plurality of cameras that captured the images of the object. In embodiments, the plurality of cameras may be located in a certain configuration and within a volume of space of an entryway of an area such as a door or entrance to an area. The plurality of cameras may be associated with or incorporate motion detection sensors such that the plurality of cameras only capture the images of an object upon the motion detection sensors detecting motion, such as motion of the object. The process 500 may include identifying the object as a human within the one or more images based at least in part on a computer vision model that uses the one or more images at 504. In embodiments, the service provider computers may be configured to train and implement one or more computer vision models to determine a presence of a certain object included in captured images as well as determine a type of object. For example, the one or more computer vision models may be trained to detect the presence of a human, an autonomous mobile robot, a cart, or an inventory holder present in the images captured by the plurality of cameras.

The process 500 may include receiving first RFID data from an RFID sensor located within the volume of space of the entryway of the area at 506. The RFID sensor may be configured to capture the RFID data from an RFID tag associated with the object. The RFID data may include a second timestamp that identifies the time when the first RFID data is captured by the RFID sensor and an identifier for the RFID tag. The identifier for the RFID tag may be unique in some embodiments. The RFID data may include a location of the RFID sensor such as coordinates of the RFID sensor in the area or in a facility. The process 500 may include determining that the object captured by the plurality of cameras has entered the area based on identifying the presence of the human in the one or more images, the first RFID data, the first timestamp, and the second timestamp at 508. In embodiments, the service provider computers implementing the object detection feature may determine the object has entered the area by correlating the capture of the images by the camera as well as the RFID data by the RFID sensor at the same time or substantially the same time (e.g. within a certain time period) of each other such that both data points indicate that an object has entered the area.

The process 500 may include determining a time threshold for the object based at least in part on the first timestamp, the second timestamp, and one or more policies for the area at 510. For example, a policy for an area that corresponds to a freezer may identify a time threshold of 30 minutes (e.g., an object should not be in the freezer for longer than 30 minutes). The process 500 may include associating the time threshold with the identifier of the RFID tag at 512. In embodiments, the service provider computers may update and maintain a database which associates time thresholds to identifiers and keeps track of the expired time until an exit event for the identifier occurs or until the time threshold expires. The process 500 may include generating, upon expiration of the time threshold, a first notification to exit the area at 514. For example, the first notification may include the identifier for the RFID tag, the time threshold, and how much time has expired since generation of the time threshold for the identifier of the RFID tag. In some embodiments, upon detecting an exit event (e.g., images captured and analyzed and correlated with updated RFID data to determine that the object has exited the area), the service provider computers may disassociate the time threshold for the identifier. The process 500 may include transmitting, to a user device associated with the RFID tag, the first notification at 516. The user device may be identified based on the identifier for the RFID tag. In some embodiments, the first notification may be provided to a user device associated with an entity, such as an administrator, associated with the area and/or a facility that includes the area. The first notification may identify the identifier of the RFID tag, the expired time threshold, and include instructions to help move the object out of the area.

In FIG. 6, the process 600 may include receiving one or more images of an object captured by a camera and information about the one or more images at 602. The information may include a first timestamp that identifies a time when the one or more images of the object are captured by the camera. The information may further include a location of the camera that captured the images of the object. In embodiments, the camera may be located inside and within a volume of space of an entryway of an area such as a door or entrance to an area. The camera may be associated with or incorporate motion detection sensors such that the camera only captures the images of an object upon the motion detection sensors detecting motion, such as motion of the object. The process 600 may include determining a presence of the object and a type of the object within the one or more images based at least in part on a computer vision model that uses the one or more images at 604. In embodiments, the service provider computers may be configured to train and implement one or more computer vision models to determine a presence of a certain object included in captured images as well as determine a type of object. For example, the one or more computer vision models may be trained to detect the presence of a human, an autonomous mobile robot, a cart, or an inventory holder present in the images captured by the plurality of cameras.

The process 600 may include receiving first RFID data from an RFID sensor located within the volume of space of the entryway of the area at 606. The RFID sensor may be configured to capture the RFID data from an RFID tag associated with the object. The RFID data may include a second timestamp that identifies the time when the first RFID data is captured by the RFID sensor and an identifier for the RFID tag. The identifier for the RFID tag may be unique in some embodiments. The RFID data may include a location of the RFID sensor in a facility or an area of the facility. The process 600 may include determining that the object captured by the camera has entered the area based on determining the presence of the object in the one or more images, the first RFID data, the first timestamp, and the second timestamp at 608. In embodiments, the service provider computers implementing the object detection feature may determine the object has entered the area by correlating the capture of the images by the camera as well as the RFID data by the RFID sensor at the same time or substantially the same time (e.g. within a certain time period) of each other such that both data points indicate that an object has entered the area.

The process 600 may include determining a threshold for the object based at least in part on the first timestamp, the second timestamp, and one or more policies for the area at 610. For example, a policy for an area that corresponds to a loading dock may identify a threshold type or number of objects that should be present in the loading dock at any given time. The process 600 may include associating the threshold with the identifier of the RFID tag at 612. For example, the service provider computers may update a database with the identifier of the RFID tag and associate or map the threshold with the identifier. The service provider computers may also track the threshold and take further steps upon expiration of a policy or rule associated with the threshold. For example, if the threshold corresponds to a time threshold (e.g., upon expiration of the 1 hour for the loading dock area scenario).

FIG. 7 illustrates an example architecture for an object detection feature that includes one or more service provider computers, a user device, camera(s), and RFID sensor(s), in accordance with at least one embodiment. In architecture 700, one or more users 702 (e.g., administrators, users, entities, etc.,) may utilize user computing devices 704(1)-(N) (collectively, user devices 704) to request information about objects in an area, compliance with policies regarding equipment for the objects, as well as time threshold information for the objects in the area from service provider computers 710 via networks 708. Users 702 may interact with user device 704 and utilize browser application 706 (access a browser application 706 or a user interface (UI) accessible through the browser application 706) to request information from service provider computers 710 as well as receive notifications or messages generated by service provider computers 710. The "browser application" 706 can be any browser control or native application that can access and display a network page or other information such as a user interface of a native software application for requesting information about objects in a facility, about the facility, about the area, as well as receiving information from the service provider computers 710. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706 and provide input regarding received notifications or messages transmitted by the service provider computers 710 or other user devices 704.

The user devices 704 may include at least one memory 714 and one or more processing units or processor(s) 716. The memory 714 may store program instructions that are loadable and executable on the processor(s) 716, as well as data generated during the execution of these programs. Depending on the configuration and type of the user devices 704, the memory 714 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 714 may include multiple different types of memory, such as static random access memory (SRAM), dynamic random access memory (DRAM), or ROM.

Turning to the contents of the memory 714 in more detail, the memory 714 may include an operating system and one or more application programs or services for implementing the features disclosed herein. Additionally, the memory 714 may include one or more modules for implementing the features described herein including the object detection module 744.

The architecture 700 may also include one or more service provider computers 710 that may, in some examples, provide computing resources such as, but not limited to, client entities, low latency data storage, durable data store, data access, management, virtualization, hosted computing environment or "cloud-based" solutions, electronic content performance management, etc. The service provider computers 710 may implement or be an example of the service provider computer(s) described herein with reference to FIGS. 1-6 and throughout the disclosure. The one or more service provider computers 710 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 710 over the networks 708 via user devices 704, the described techniques may equally apply in instances where the users 702 interact with the one or more service provider computers 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 710 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 710 may be in communication with the user device 704 via the networks 708, or via other network connections. The one or more service provider computers 710 may include one or more servers, perhaps arranged in a cluster or as individual servers not associated with one another.

The architecture 700 may include cameras 712 and RFID sensors 724 that are in communication with the service provider computers 710 and/or the user devices 704 via networks 708. In embodiments, the cameras 712 may include memory 718, processor(s) 720, and one or more motion detection sensors 722. The memory 718 may store program instructions that are loadable and executable on the processor(s) 720, as well as data generated during the execution of these programs and/or program instructions. In accordance with at least one embodiment, the cameras 712 may be configured, in response to the motion detection sensors 722 activating upon detecting motion, to capture videos or images of an area and transmit the videos or images to service provider computers 710 via networks 708. As discussed below, the object detection module 744 may be configured to implement one or more computer vision models for detecting a presence of an object as well as determining a type of object using the videos or images captured by cameras 712. In some examples, the memory 718 and processors 720 may be configured to implement, via objection detection module 744, the computer vision models, determine a presence and type of object in the captured images or video, and transmit the determined information derived from the images or video to the service provider computers 710 via networks 708. In some examples, the cameras 712 may implement the object detection module 744 in memory 718.

The architecture 700 may include RFID sensors 724 which may include memory 726 and processors 728. The memory 726 may store program instructions that are loadable and executable on the processor(s) 728, as well as data generated during the execution of these programs and/or program instructions. In embodiments, the RFID sensors 724 (RFID readers or sensors) may be configured to capture RFID data from RFID tags within detection range of the RFID sensors 724. The RFID data may include timestamp information identifying when the RFID sensors 724 captured the RFID data, location information (e.g., a location (coordinates) of the RFID sensor 724 in an area or facility), as well as an identifier associated with the RFID which provided the RFID data. In embodiments, the RFID sensors 724 may be configured to transmit the RFID data, via networks 708, to service provider computers 710.

In one illustrative configuration, the one or more service provider computers 710 may include at least one memory 730 and one or more processing units or processor(s) 732.

The processor(s) 732 may be implemented as appropriate in hardware, computer-executable instructions, firmware, or combination thereof. Computer-executable instruction or firmware implementations of the processor(s) 732 may include computer-executable or machine-executable instructions written in any suitable programming language to perform the various functions described when executed by a hardware computing device, such as a processor. The memory 730 may store program instructions that are loadable and executable on the processor(s) 732, as well as data generated during the execution of these programs. Depending on the configuration and type of the one or more service provider computers 710, the memory 730 may be volatile (such as RAM) and/or non-volatile (such as ROM, flash memory, etc.). The one or more service provider computers 710 or servers may also include additional storage 734, which may include removable storage and/or non-removable storage. The additional storage 734 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 730 may include multiple different types of memory, such as SRAM, DRAM, or ROM.

The memory 730, the additional storage 734, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 730 and the additional storage 734 are all examples of non-transitory computer storage media. Additional types of non-transitory computer storage media that may be present in the one or more service provider computers 710 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 710. Combinations of any of the above should also be included within the scope of non-transitory computer-readable media.

The one or more service provider computers 710 may also contain communication connection interface(s) 736 that allow the one or more service provider computers 710 to communicate with a data store, another computing device or server, user terminals, and/or other devices on the networks 708. The one or more service provider computers 710 may also include I/O device(s) 738, such as a keyboard, a mouse, a pen, a voice input device, a touch input device, a display, speakers, a printer, etc.

Turning to the contents of the memory 730 in more detail, the memory 730 may include an operating system 740, one or more data stores 742, and/or one or more application programs or services for implementing the features disclosed herein including the object detection module 744. In accordance with at least one embodiment, the object detection module 744 may be configured to determine a presence of an object in an area, such as an entrance, entryway, or door to the area, and a type of the object using one or more images or video captured by the cameras 712. In embodiments, the object detection module 744 may implement one or more computer vision models that are trained to detect the presence of an object as well as determine a type of the object. For example, the computer vision models may be trained to identify a presence of a human in videos or images, identify a presence of a specific object such as an autonomous mobile robot, a cart, or a box in the videos or images. The object detection module 744 may be configured to correlate the detection of an object in the images or video captured by the cameras 712 with RFID data captured by RFID sensors 724. For example, timestamp information associated with the images or video as well as the RFID data may be compared to determine that the capturing events for both the cameras 712 and RFID sensors 724 are the same events (e.g., correspond to the detection of the same object as they occurred at or around the same time period).

In accordance with at least one embodiment, the object detection module 744 may be configured to determine a time threshold for the object and the area based on policies maintained for the area by the service provider computers 710 as well as the timestamp provided by the cameras 712 and RFID sensors 724 (first timestamp, and second timestamp). The object detection module 744 may be configured to associate an identifier of the RFID tag providing the RFID data to the RFID sensors 724 with the determined time threshold. The object detection module 744 may be configured to generate and transmit a notification to a user device associated with the identifier (such as user device 704) upon expiration of the time threshold, and no indication that updated RFID data from the RFID tag and identifier as well as updated videos and images identifying the object associated with the RFID tag have exited the area. In embodiments, the object detection module 744 may be configured to determine a presence of equipment or objects such as personal protective equipment in the images or video provided by the cameras 712 using the implemented computer vision models. The object detection module 744 may be configured to correlate the presence or absence of the equipment or objects in the video or images based on RFID data captured by RFID sensors 724 from RFID tags associated with the objects or equipment. For example, an RFID tag may be incorporated into a protective vest work by a human entering an area. The service provider computers 710 and object detection module 744 may be configured to maintain policies for the area or facility which identify particular pieces of equipment required to enter the area or facility. If the detected and determined objects or equipment (presence or absence) violate the policies, the object detection module 744 ma generate and transmit a notification or message that identifies the missing or present equipment or objects which violate the policies. The notification or message can be provided to a user device such as user device 704.

Figure 8:
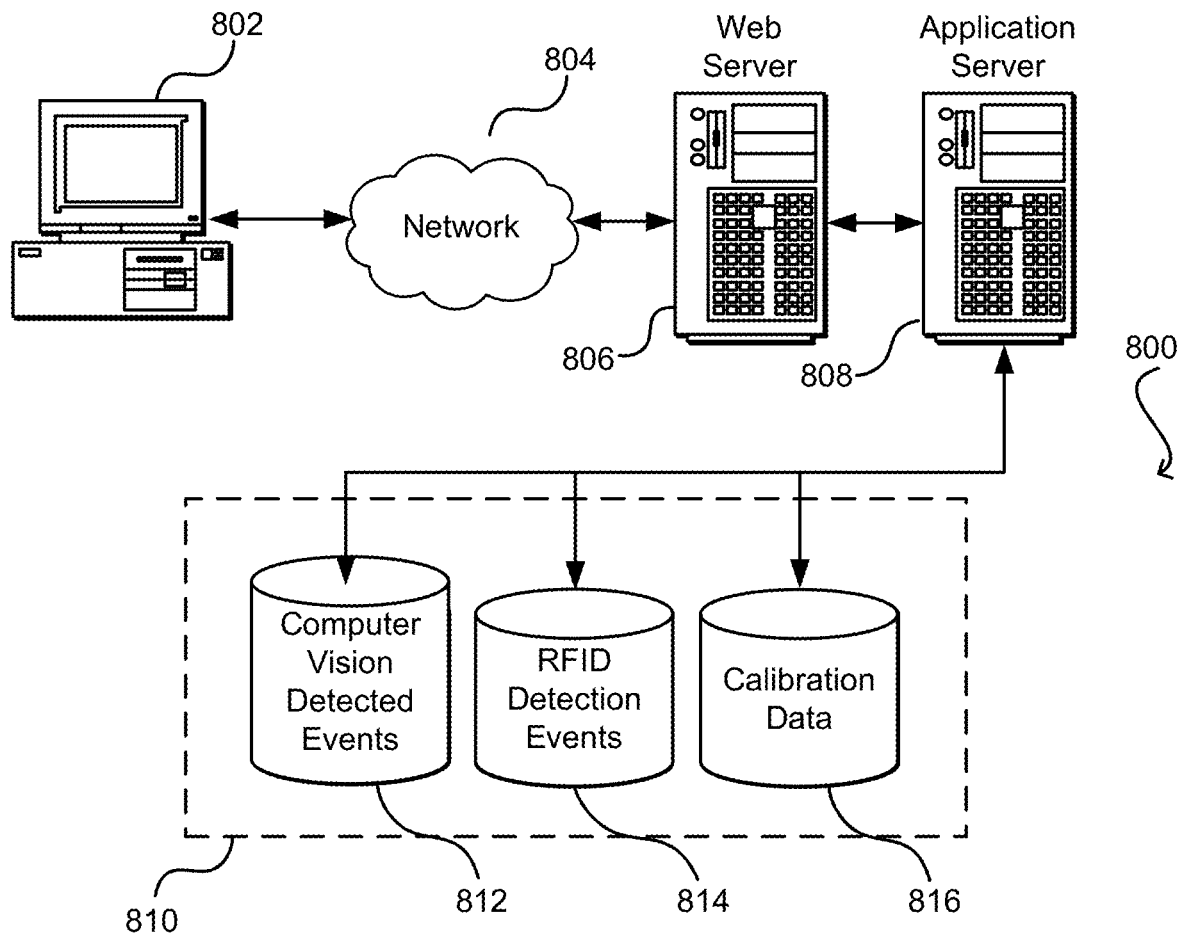
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network 804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 804 can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 808 can include any appropriate hardware and software for integrating with the data store 810 as needed to execute aspects of one or more applications for the client device 802, handling a majority of the data access and business logic for an application. The application server 808 provides access control services in cooperation with the data store 810 and is able to generate content such as text, graphics, audio, and/or video to be transferred to a user associated with client device 802, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server 806. It should be understood that the Web 806 and application 808 servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing computer vision detected events 812 and calibration data 816, which can be used to serve content for the production side such as notifications that an object has exceeded the time threshold for being in an area. The data store also is shown to include a mechanism for storing RFID detection events 814, which can be used for reporting, analysis, or other such purposes such as being combined with computer vision detected events stored in 812 for determining that an object has entered an area, determining a time threshold for the object, and generating notifications when the object has not exited the area by the time threshold. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, an administrator associated with a facility might submit a request for entities or objects currently located within an area and time thresholds associated with each entity or object. In this case, the data store 810 might access the computer vision detected events 812 and RFID detection events 814 to verify the presence of an entity or object in the area and well as the associated time threshold for the entity or object. This information then can be returned to the administrator or user, such as in a results listing on a Web page that the user is able to view via a browser on the client device 802. Information for particular objects of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C #, or C++, or any scripting language, such as Perl, Python, or TCL, as well as combinations thereof. The server(s) may also include database servers, including without limitation those commercially available from Oracle©, Microsoft©, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, one or more images of an object captured by a plurality of cameras and information about the one or more images, the plurality of cameras located in a certain configuration and within a volume of space of an entryway of an area, the plurality of cameras configured to capture the one or more images in response to associated motion detection sensors detecting the object, the information including a first timestamp that identifies a time when the one or more images of the object are captured by the plurality of cameras;
   identifying, by the computer system, the object as a human within the one or more images based at least in part on a computer vision model that uses the one or more images, the computer vision model implemented by the computer system;
   receiving, by the computer system, first radio frequency identification (RFID) data from an RFID sensor, the RFID sensor located within the volume of space of the entryway of the area, the first RFID data captured by the RFID sensor from an RFID tag associated with the object, the first RFID data including a second timestamp that identifies the time when the first RFID data is captured by the RFID sensor and an identifier for the RFID tag;
   determining, by the computer system, that the object captured by the plurality of cameras has entered the area based at least in part on identifying the presence of the human in the one or more images, the first RFID data, the first timestamp, and the second timestamp;
   determining, by the computer system, a time threshold for the object based at least in part on the first timestamp, the second timestamp, and one or more policies for the area;
   associating, by the computer system, the time threshold with the identifier for the RFID tag;
   generating, by the computer system and upon expiration of the time threshold, a first notification to exit the area; and
   transmitting, by the computer system and to a user device associated with the RFID tag, the first notification, the user device identified based on the identifier for the RFID tag.

2. The computer-implemented method of claim 1, further comprising identifying, by the computer system, a presence of one or more pieces of equipment in the one or more images based at least in part on the computer vision model that uses the one or more images captured by the plurality of cameras, the one or more pieces of equipment associated with the object.

3. The computer-implemented method of claim 2, further comprising receiving, by the computer system, second RFID data from the RFID sensor, the second RFID data captured by the RFID sensor from one or more RFID tags associated with the one or more pieces of equipment.

4. The computer-implemented method of claim 3, further comprising:
- determining, by the computer system, a required amount of the equipment and a type of the equipment required for the area based at least in part on the one or more policies for the area;
- generating, by the computer system, a second notification that identifies the required amount of the equipment and the type of the equipment based on identifying the presence of the one or more pieces of equipment in the one or more images and the second RFID data; and
- transmitting, by the computer system, the second notification to the user device associated with the RFID tag.

5. A computer-implemented method, comprising:
- receiving, by a computer system, one or more images of an object captured by a camera and information about the one or more images, the camera located inside and within a volume of space of an entryway of an area, the camera configured to capture the one or more images in response to an associated motion detection sensor detecting the object, the information including a first timestamp that identifies a time when the one or more images of the object are captured by the camera;
- determining, by the computer system, a presence of the object and a type of the object within the one or more images based at least in part on a computer vision model that uses the one or more images, the computer vision model implemented by the computer system;
- receiving, by the computer system, first radio frequency identification (RFID) data from an RFID sensor, the RFID sensor located within the volume of space of the entryway of the area, the first RFID data captured by the RFID sensor from an RFID tag associated with the object, the first RFID data including a second timestamp that identifies the time when the first RFID data is captured by the RFID sensor and an identifier for the RFID tag;
- determining, by the computer system, that the object has entered the area based at least in part on determining the presence of the object within the one or more images, the first RFID data, the first timestamp, and the second timestamp;
- determining, by the computer system, a threshold for the object based at least in part on the first timestamp, the second timestamp, and one or more policies for the area; and
- associating, by the computer system, the threshold with the identifier for the RFID tag.

6. The computer-implemented method of claim 5, wherein the threshold is a time threshold and further comprising:
- generating, by the computer system and upon expiration of the time threshold, a notification to exit the area that includes the identifier for the RFID tag; and
- transmitting, by the computer system and to a user device associated with the identifier, the notification.

7. The computer-implemented method of claim 6, wherein the one or more policies for the area are based at least in part on the type of the object.

8. The computer-implemented method of claim 5, wherein the computer vision model is further configured to determine a direction of motion of the object based at least in part on the one or more images.

9. The computer-implemented method of claim 5, wherein determining the threshold for the object is further based at least in part on the type of the area.

10. The computer-implemented method of claim 5, further comprising:
- receiving, by the computer system, updated images of the object captured by the camera and the information about the updated images, the information including a third timestamp that identifies the time when the updated images of the object are captured by the camera, the threshold being a time threshold;
- determining, by the computer system, the presence of the object within the updated images based at least in part on the computer vision model that uses the updated images;
- receive, second RFID data from the RFID sensor from the RFID tag associated with the object, the second RFID data including a fourth timestamp that identifies the time when the second RFID data is captured by the RFID sensor and the identifier for the RFID tag; and
- determining, by the computer system, that the object has exited the area within the time threshold based at least in part on determining the presence of the object within the updated images, the third timestamp, the fourth timestamp, and the time threshold for the object.

11. The computer-implemented method of claim 10, further comprising disassociating, by the computer system and in response to determining that the object has exited the area, the time threshold with the identifier for the RFID tag.

12. The computer-implemented method of claim 5, further comprising determining, by the computer system, that the object has entered the area based at least in part on determining the presence of the object within the one or more images and absent the RFID data and the second timestamp.

13. The computer-implemented method of claim 5, further comprising updating, by the computer system, the second timestamp for the first RFID data by a specified time period.

14. The computer-implemented method of claim 13, further comprising modifying, by the computer system, the updated second timestamp based at least in part on data from a facility that identifies a change to a physical structure of the area, the area located within the facility.

15. A computer system associated with a facility comprising:
- a memory configured to store computer-executable instructions;
- a camera associated with a motion detection sensor that is located at an entryway of an area of the facility and configured to capture images of an object in response to the motion detection sensor detecting the object;
- a plurality of radio frequency identification (RFID) sensors located at the entryway of the area of the facility and configured to capture RFID data from RFID tags;
- a processor in communication with the memory and configured to execute the computer-executable instructions to at least:
  - receive the images of the object captured by the camera and information about the images, the information including a first timestamp that identifies a time when the images of the object are captured by the camera;
  - determine a presence of object and a type of the object within the images based at least in part on a computer vision model that uses the images, the computer vision model implemented by the computer system;

receive first RFID data from the plurality of RFID sensors, the first RFID data captured by the RFID sensors from an RFID tag associated with the object, the first RFID data including a second timestamp that identifies the time when the first RFID data is captured by the plurality of RFID sensors and an identifier for the RFID tag;

determine that the object has entered the area based at least in part on determining the presence of the object within the images, the first RFID data, the first timestamp, and the second timestamp;

determine a threshold for the object based at least in part on the first timestamp, the second timestamp, and one or more policies for the area; and associate the threshold with the identifier for the RFID tag.

16. The computer system of claim 15, wherein the threshold is a time threshold and wherein the processor in communication with the memory is further configured to execute the computer-executable instructions to at least:

generate, upon expiration of the time threshold, a notification to exit the area that includes the identifier for the RFID tag; and transmit, to a user device associated with the identifier, the notification.

17. The computer system of claim 16, wherein generating and transmitting the notification occurs prior to expiration of the time threshold and within a certain time period prior to the time threshold.

18. The computer system of claim 15, wherein the processor in communication with the memory is further configured to execute the computer-executable instructions to at least receive, from the plurality of RFID sensors, calibration data that indicates RFID detection events that are not transmitted to the computer system.

19. The computer system of claim 18, wherein the processor in communication with the memory is further configured to execute the computer-executable instructions to at least:

generate instructions for updating calibration of detection for the plurality of RFID sensors based at least in part on the calibration data and the determining of the presence of the object within the images; and transmit the instructions to the plurality of RFID sensors.

20. The computer system of claim 19, wherein the instructions are transmitted to only a portion of the plurality of RFID sensors, the portion of the plurality of RFID sensors determined based at least in part on the calibration data.

* * * * *